(12) United States Patent
Birch et al.

(10) Patent No.: US 7,272,568 B1
(45) Date of Patent: Sep. 18, 2007

(54) SYSTEM AND METHOD FOR MATCHING AN OFFER WITH A QUOTE

(75) Inventors: Hugh H. Birch, Woodinville, WA (US); David A. Beitel, Seattle, WA (US); Dhiren R. Fonseca, Seattle, WA (US)

(73) Assignee: Expedia, Inc., Bellevue, WA (US)

( * ) Notice: Subject to any disclaimer, the term of this patent is extended or adjusted under 35 U.S.C. 154(b) by 1440 days.

(21) Appl. No.: 09/648,581

(22) Filed: Aug. 25, 2000

(51) Int. Cl.
*G06Q 10/00* (2006.01)

(52) U.S. Cl. .............................. 705/5; 705/26; 705/27; 705/80

(58) Field of Classification Search .................... 705/5, 705/37, 26, 27, 6, 80
See application file for complete search history.

(56) References Cited

U.S. PATENT DOCUMENTS

| | | | | |
|---|---|---|---|---|
| 5,021,953 A | * | 6/1991 | Webber et al. ................. | 705/6 |
| 5,331,546 A | * | 7/1994 | Webber et al. ................. | 705/6 |
| 5,570,283 A | | 10/1996 | Shoolery et al. | |
| 5,794,207 A | * | 8/1998 | Walker et al. ................. | 705/1 |
| 5,797,127 A | * | 8/1998 | Walker et al. ................. | 705/5 |
| 5,802,502 A | | 9/1998 | Gell et al. | |
| 5,897,620 A | | 4/1999 | Walker et al. | |
| 5,948,040 A | * | 9/1999 | DeLorme et al. ........... | 701/201 |
| 5,995,602 A | | 11/1999 | Johnson et al. | |
| 6,012,045 A | | 1/2000 | Barzilai et al. | |
| 6,014,644 A | | 1/2000 | Erickson | |
| 6,023,501 A | | 2/2000 | Wakamatsu | |
| 6,023,685 A | | 2/2000 | Brett et al. | |
| 6,085,164 A | | 7/2000 | Smith et al. | |
| 6,085,169 A | * | 7/2000 | Walker et al. ................. | 705/26 |
| 6,356,878 B1 | * | 3/2002 | Walker et al. ................. | 705/26 |
| 6,360,205 B1 | * | 3/2002 | Iyengar et al. ................. | 705/5 |

FOREIGN PATENT DOCUMENTS

WO    WO99/23595    * 5/1999

OTHER PUBLICATIONS

"Airlines Take to the Internet", Miller, William, Industry Week, vol. 248, Iss. 15, Aug. 16, 1999, 4 pages.*

* cited by examiner

*Primary Examiner*—F. Zeender
*Assistant Examiner*—M. Thein
(74) *Attorney, Agent, or Firm*—Christensen O'Connor Johnson Kindness PLLC

(57) ABSTRACT

Described is a system and method for matching a customer's offer for travel services with quotes from providers of those travel services in a way that allows the providers to negotiate preferential treatment. An online travel service exchanger receives an offer from a customer for travel services, such as airfare. The online travel service exchanger attempts to satisfy the customer's offer by retrieving from a global distribution system one or more quotes for the identified travel services. Rather than merely requesting quotes from randomly selected airlines, the online travel service exchanger first requests quotes from one preferred airline at a time in descending order of preference until the offer is satisfied. If no preferred airline satisfies the offer, the online travel service exchanger may request quotes from a group of non-preferred airlines. The online travel service exchanger then satisfies, if possible, the offer with one of the quotes from the non-preferred airlines.

29 Claims, 12 Drawing Sheets

FIG. 5

| AIRLINE ID (CARRIER CODE) 503 | PREFERRED (Y/N) 505 | PREFERENCE 507 | PREFERRED CRITERIA 508 | OTHER INFO. 509 |
|---|---|---|---|---|
| | | | | |

501 — AIRLINE DATABASE

FIG. 6

| BID ID 603 | CUST. ID 605 | TIME OF BID 607 | OTHER BID INFO. 609 |
|---|---|---|---|
| | | | |

601 — BID HISTORY DATABASE

801

OTSE USER INTERFACE

TRAVELER INFORMATION?

803 — LAST NAME: [ ]

805 — FIRST NAME: [ ]

807 — HOME PHONE NUMBER: [ ][ ]   WORK PHONE NUMBER: [ ][ ]

809 — [-- SPECIAL ASSISTANCE --▼]

811 — EMERGENCY CONTACT

NAME: [ ]

CONTACT PHONE NUMBER: [ ][ ]

CREATE AN ACCOUNT

813 — MEMBER ID: [ ]

815 — PASSWORD: [ ]

☑ SAVE THIS PASSWORD

817 — E-MAIL ADDRESS: [ ]

819 — ☑ SEND ME INFORMATION

821 — ➡ NEXT STEP

FIG. 8

SYSTEM AND METHOD FOR MATCHING AN OFFER WITH A QUOTE

FIELD OF THE INVENTION

The present invention relates to electronic commerce. More specifically, the invention relates to the purchase of travel services, such as airfare, in an electronic exchange transaction.

BACKGROUND OF THE INVENTION

More and more people are purchasing goods and services electronically, such as over the Internet. Electronic exchange systems are achieving widespread use in the area of travel arrangements. These systems provide an outlet for suppliers having surplus inventory, and often allow consumers to obtain desired goods or services at below-market rates. One such system of electronic exchange is used by "online travel service exchangers" and allows customers to place an offer for travel services, such as airfare or airline accommodations. However, existing online travel service exchangers suffer from various problems. For instance, existing systems do not allow individual travel service providers to better their chances at being selected as the winner of the offer. One reason is that existing online travel service exchangers satisfy a consumer's offer by simply querying a list of providers to determine whether one or more are willing to accept the consumer's offer. The first provider that satisfies the offer is selected and the offer is matched. Travel service providers are not incentivized to offer more-attractive rates that will increase the likelihood that a customer offer will be accepted.

In addition, existing schemes charge a purchaser the value of the purchaser's offer even if that value exceeds what the purchaser would have paid without the aid of the electronic travel service system. In other words, even if the purchaser's offer exceeds a published rate for the travel services, existing schemes punish the purchaser by charging her the full value of the offer.

An effective electronic exchange system for matching an offer by a consumer with a quote from a travel service provider has eluded those skilled in the art.

SUMMARY OF THE INVENTION

Briefly stated, the present invention provides a system that matches customer's offers for travel services with quotes from providers of those travel services in a way that allows providers to negotiate preferential treatment. The travel service exchanger first assigns providers to one of two provider groups: a preferred provider group and a non-preferred provider group. Within the preferred provider group, each of a plurality of providers is assigned a ranking. The preferred provider status, and the ranking assigned to each preferred provider within the preferred provider group, may be negotiated between the travel service exchanger and the individual providers. Each ranking may correspond to slightly different criteria with respect to pricing, availability requirements, profit margins, and various other criteria. The non-preferred providers may be grouped together with no particular ranking, but they may also be ranked according to some negotiated agreement or some other criteria.

When a customer offer is received, the travel service exchanger may attempt to satisfy the customer offer from published fares (e.g., "rack rates") for the desired travel services. For example, a customer's offer for airfare between two cities at a certain price may be higher than a rate at which the customer can purchase the airfare without the aid of the electronic exchange process. In that case, the travel service exchanger acts as an electronic travel agent, and satisfies the customer's offer without resorting to the preferred or non-preferred groups and charges the customer the published rate (rather than the full value of the offer). In the more common situation where the customer offer is below the published fares, the travel service exchanger requests rate information from the highest-ranked provider in the preferred provider group for the travel services identified in the customer offer. The highest-ranked provider may return one or more fares. The travel service exchanger compares the fares returned by the highest-ranked provider to the customer offer. If the offer can be satisfied by the highest-ranked provider, then the offer is matched with the highest rate supplied by the highest-ranked provider and the airfare is booked. If the offer cannot be satisfied by any of the fares supplied by the highest-ranked provider, then the travel service exchanger moves to the next-highest ranked provider and repeats the request. The request is made to each preferred provider, in order of preference, until either the customer offer is satisfied, or the preferred provider group is exhausted, meaning that none of the preferred providers were able to satisfy the customer offer within the constraints of the preferential rankings.

If customer offer is not satisfied by the preferred providers, the travel service exchanger moves to the non-preferred provider group. The travel service exchanger then issues requests to each non-preferred provider for fares on the travel services described in the customer offer. The travel service exchanger then selects a rate from those returned as a match for the customer offer. The travel service exchanger may base the selection of a matching rate on the lowest rate, the least restrictive rate, the highest rate that still affords the travel service exchanger a reasonable profit, a random selection, or any other criteria. It should be noted that the fares supplied by the preferred providers, although not satisfying the constraints of the preferential treatment, may still be used in the non-preferred provider analysis. In addition, when evaluating whether a rate satisfies the customer offer, the travel service exchanger includes the actual taxes that will be imposed on the purchase transaction to ensure that the customer is not surprised by a charge that exceeds the customer offer because of taxes. Finally, if a satisfactory rate is selected, the travel services are booked with the corresponding service provider.

These and other aspects of the invention, together with the benefits and advantages realized, will become apparent from a reading of the following detailed description in conjunction with the drawings, in which:

BRIEF DESCRIPTION OF THE DRAWINGS

FIG. 5 illustrates, in tabular format, one example of the type of information that may be stored within an airline database employed in one implementation of the present invention;

FIG. 6 illustrates, in tabular format, one example of the type of information that may be stored within an offer history database employed in one implementation of the present invention;

FIGS. 7-9 are sample screen displays that may be presented to a customer when interfacing with one implementation of the present invention;

DETAILED DESCRIPTION

One illustrative system constructed in accordance with the present invention may be implemented as an electronic travel services broker. The several components of the illustrative system are described first, followed by a description of the operation of the system through the interaction of the several components. The illustrative system described is but one of many alternative electronic exchange purchase transactions that can be implemented in accordance with the present invention, and the breadth and scope of the invention is not limited to the particular embodiments described here.

Exemplary Computing Device

Figure 1:
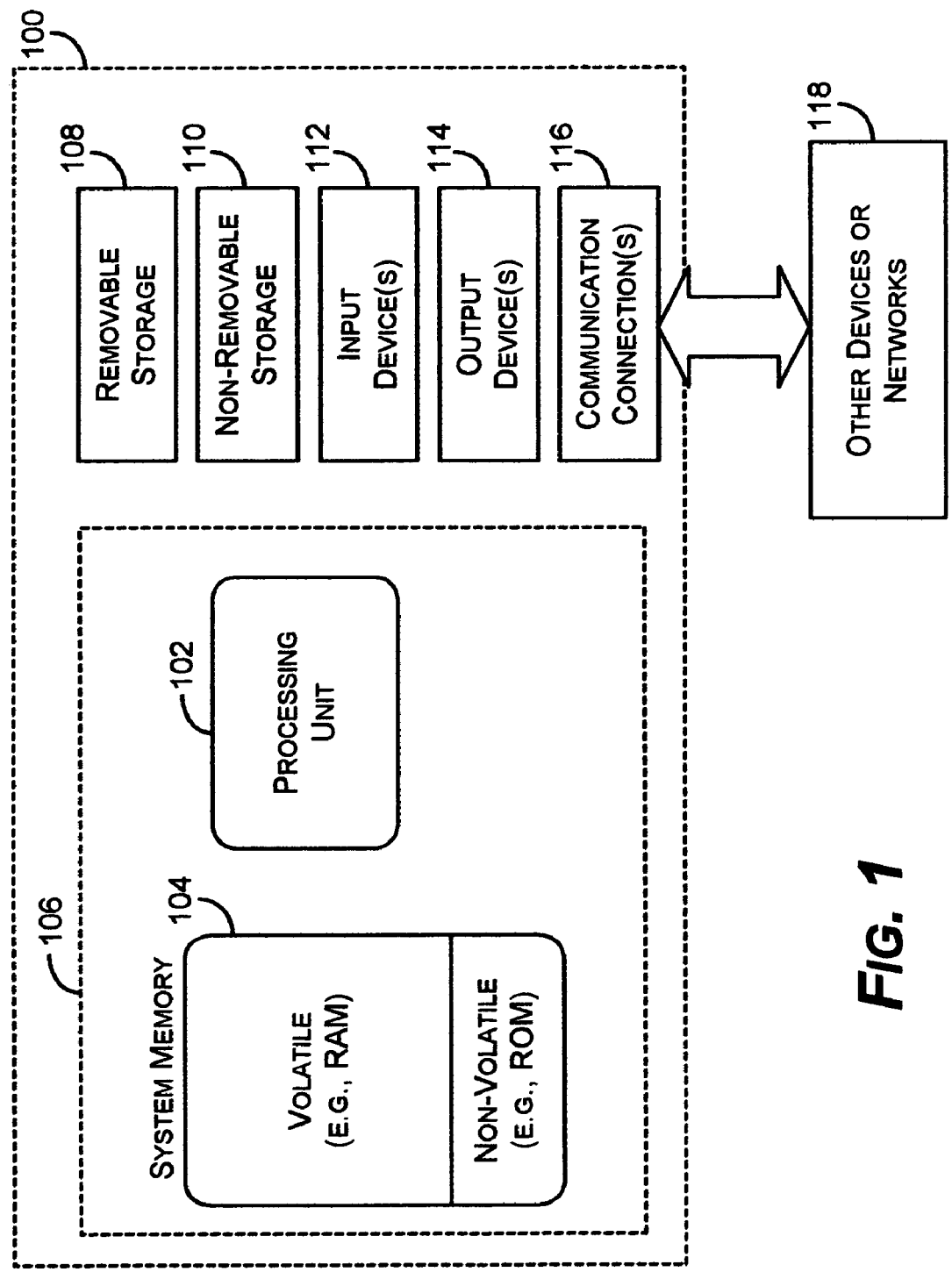
FIG. 1 is a block diagram representing a typical computer system into which one implementation of the present invention may be incorporated.

FIG. 1 is a functional block diagram generally illustrating a computing device 100, one or more of which may be adapted for use in the illustrative system for implementing the invention. The computing device may be, for example, a personal computer, a handheld device such as a cell phone or a personal digital assistant, multi-processor systems, microprocessor-based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

In its most basic configuration, computing device 100 typically includes at least one processing unit 102 and system memory 104. Depending on the exact configuration and type of computing device, system memory 104 may be volatile (such as RAM), non-volatile (such as ROM, flash memory, etc.) or some combination of the two. The basic configuration of the device 100 is illustrated in FIG. 1 within dashed line 106.

Device 100 may also have additional features and functionality. For example, device 100 may also include additional storage (removable and/or non-removable) including, but not limited to, magnetic or optical disks or tape. Such additional storage is illustrated in FIG. 1 by removable storage 108 and non-removable storage 110. Computer storage media includes volatile and nonvolatile, removable and non-removable media implemented in any method or technology for storage of information such as computer readable instructions, data structures, program modules, or other data. System memory 104, removable storage 108, and non-removable storage 110 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by device 100. Any such computer storage media may be part of device 100.

Device 100 includes one or more input devices 112 such as a keyboard, mouse, pen, puck, voice input device, touch input device, scanner, or the like. One or more output devices 114 may also be included, such as a video display, audio speakers, a printer, or the like. Input and output devices are well known in the art and need not be discussed at length here.

Device 100 also contains communications connection 116 that allows the device 100 to communicate with other devices 118, such as over a local or wide area network. Communications connection 116 is one example of communication media. Communication media includes any information delivery media that serves as a vehicle through which computer readable instructions, data structures, program modules, or other data may be delivered on a modulated data signal, such as a carrier wave or other transport mechanism. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, electromagnetic (e.g., radio frequency), infrared, and other wireless media. The term computer readable media as used herein includes both storage media and communication media.

Illustrative Electronic Travel Agent System

Figure 2:
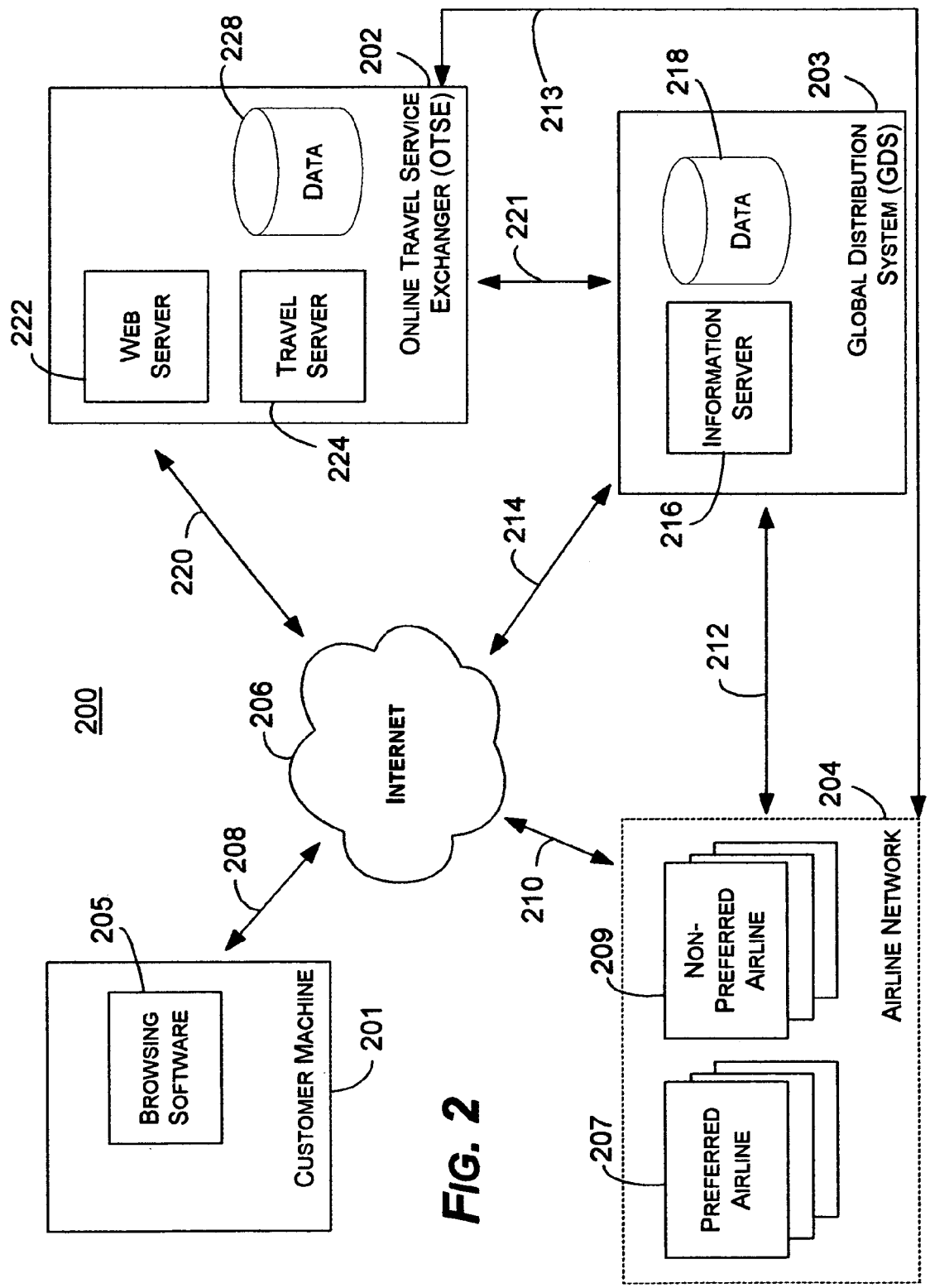
FIG. 2 is a functional block diagram generally illustrating one implementation of an online travel service exchanger system constructed in accordance with the present invention.

FIG. 2 is a functional block diagram generally illustrating one implementation of an electronic travel service exchanger system (the system 200) constructed in accordance with the present invention. The system 200 is constructed to aid a customer to purchase a product, such as travel goods or services, in an electronic exchange transaction. The system 200 may be implemented as software modules or components stored and executing on one or more computing devices, such as that illustrated in FIG. 1. The system illustrated in FIG. 2 and described here is but one of the many implementations that will become apparent by the teachings of the present invention.

The system 200 includes a customer machine 201, an online Travel service exchanger (OTSE) 202, an availability determination component 203 (e.g., a Global Distribution System), and a network 204 of travel service providers, such as airlines that have agreed to participate in the system 200. Although well suited for use in conjunction with an airline network 204, this implementation of the invention has equal applicability to other provider networks and the airline network 204 is offered only as one example. As described below, each of these components may include one or more computing devices, such as the computing device 100 described above. Moreover, each of the components may be interconnected over a wide area network, such as the Internet 206. Although the following discussion will make reference to the Internet 206 as a specific wide area network, those skilled in the art will appreciate that any mechanism for connecting multiple computing devices may equally be used.

The customer machine 201 is a computing device connected to the Internet 206 over a network connection 208, such as a dial-up modem connection, a coaxial cable connection, a digital subscriber line connection, or the like. The customer machine 201 may be adapted to interact with other computing devices over the Internet 206 through the use of browsing software 205. The browsing software 205 may be integrated into an operating system executing on the customer machine 201. Via the browsing software 205, a customer of the customer machine 201 may retrieve Web pages or other documents from other computing devices attached to the Internet 206, and may additionally provide information to those other computing devices.

The Global Distribution System (GDS) 203 is a central repository of fare and availability information for the airlines in the airline network 204. The GDS 203 may interface with other computing devices connected to the Internet 206 via network connection 214. If it is connected to the Internet 206, the GDS 203 may include information server software 216 for managing transactions with other computing devices over the Internet 206. The GDS 203 may include and maintain a data store 218 that contains the fare information associated with each airline in the airline network 204. As will be appreciated by those in the art, the GDS 203 may store fare information for both public fares (e.g., those made available to the general public), and private fares (e.g., special fares negotiated between individual airlines and brokers, such as the OTSE 202).

The GDS 203 is adapted to place queries to each airline in the airline network 204 and receive current fare information from those airlines, and to store that information in the data store 218. The GDS 203 may make that information available to entities interested in booking travel arrangements, such as the OTSE 202. Moreover, the GDS 203 is adapted to make reservations with airlines in the airline network 204 upon request by those entities. The use of a global distribution system, such as the GDS 203, to transact with airlines is generally known in the art. It should be appreciated that each airline in the airline network 204 may be connected to and interface with the GDS 203 in a conventional manner to upload fares and download booking and ticketing information. Examples of such global distribution systems in common use today are Worldspan, SABRE, Galileo, and Amadeus.

One or more airlines in the airline network 204 may be connected to the Global Distribution System (GDS) 203 over the Internet 206, via network connection 210. Alternatively, one or more airlines may be directly connected to the GDS 203, such as through a dedicated network connection 212. In addition, one or more airlines may directly connect to the OTSE 202 via a dedicated network connection 213.

The airline network 204 includes two groups of airlines: a preferred airlines group 207 and a non-preferred airlines group 209. Each of the preferred airlines 207 is assigned a distinct preference. As will be discussed in detail later, the preferences provide a mechanism by which an airline may increase its likelihood of being selected as a match for the customer's offer. More particularly, the preferences are used by the OTSE 202 to determine the order in which quotes are requested from the airlines in the airline network 204. The preference may be negotiated between the particular preferred airlines 207 and the entity responsible for maintaining the OTSE 202. For example, in order to better its chances of being selected as a match for the customer's offer, an airline may agree to guarantee an acceptable profit margin to the OTSE 202. The preference assigned to each preferred airline may reflect the amount of guaranteed profit margin negotiated by each preferred airline (e.g., those airlines guaranteeing lower profit margins are granted lower preferences).

As another example, preferences may be assigned according to particular airlines' market share. That is, airlines are chosen based upon a round robin scheme where an airline having X percent of market share is given most-preferred status X percent of the time. Alternatively, the market share of the airline may be factored into a scheme for deciding preference. In another example, an airline may be given regional or geographical preferencing. Many alternatives are contemplated, including but not limited to providing preferred airlines alphabetically, contractually, or randomly.

The non-preferred airlines group 209 constitutes those airlines that provide the OTSE 202 with private fares (e.g., fares below the public published fares) but choose not to negotiate preferential treatment. In other words, the non-preferred airlines 209 accept a lower chance of being selected in exchange for not providing fare guarantees to the OTSE 202.

The OTSE 202 includes one or more computing devices, such as that illustrated in FIG. 1, and is connected to the Internet 206 through a network connection 220. The OTSE 202 optionally may be connected to the GDS 203 through a dedicated network connection 221. The OTSE 202 is illustrated in greater detail in FIG. 3 and described below. Generally described, the OTSE 202 includes a Web server component 222, a travel server component 224, and a data store 228. Although illustrated in three components, those skilled in the art will appreciate that the functions of each described component may be merged into fewer components, or similarly, distributed among more components. The use of three illustrative components is for simplicity of discussion only, and should not be viewed as an exclusive list of possible components.

Briefly described, the OTSE 202 interfaces with the customer machine 201 and the GDS 203 to administer an electronic exchange purchase transaction. As described in greater detail below, the OTSE 202 receives an offer from the customer machine 201, via the Internet 206, for travel services, such as an airline ticket. The OTSE 202 attempts to satisfy the customer's offer by retrieving from the GDS 203 one or more quotes for the identified travel services. Rather than merely requesting quotes from randomly selected airlines, the OTSE 202 first requests quotes from one preferred airline at a time in descending order of preference until the offer is satisfied. If no preferred airline satisfies the offer, the OTSE 202 may request quotes from a group of non-preferred airlines in the airline network 204. The OTSE 202 then satisfies, if possible, the offer with one of the quotes from the non-preferred airlines.

Figure 3:
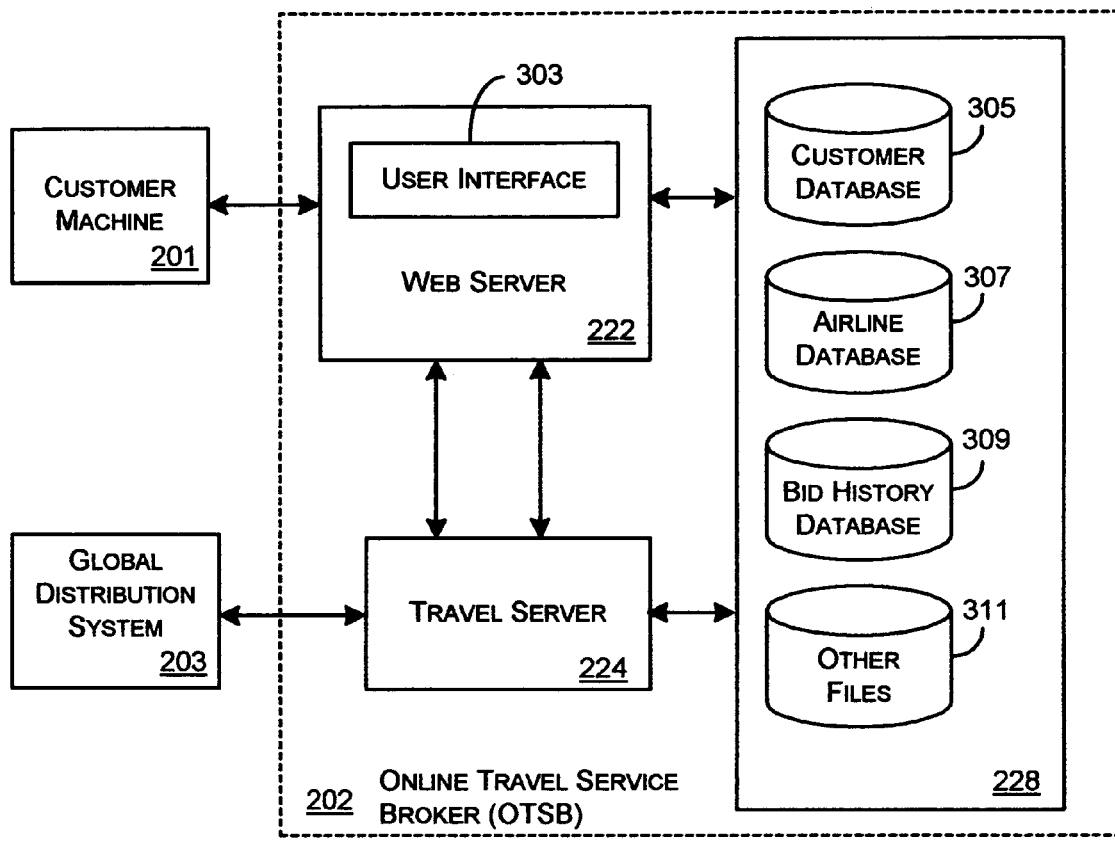
FIG. 3 is a functional block diagram generally illustrating one implementation of an online travel service exchanger of the system illustrated in FIG. 2.
Figure 4:
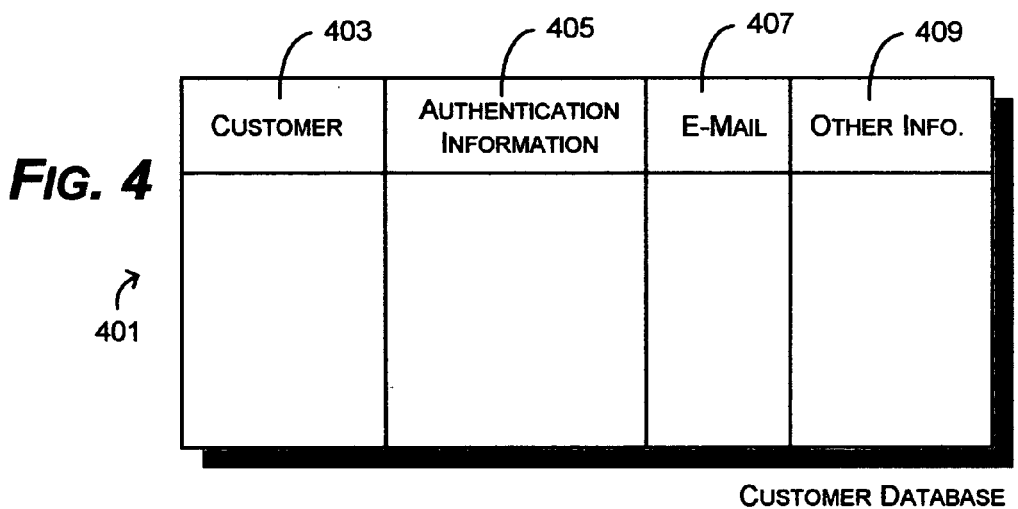
FIG. 4 illustrates, in tabular format, one example of the type of information that may be stored within a customer database employed in one implementation of the present invention.

FIG. 3 is a functional block diagram generally illustrating one implementation of the OTSE 202. As mentioned above, the OTSE 202 includes a Web server component 222, a travel server component 224, and a data store 228. The data store 228 of the described embodiment contains various types of information used by the different components of the OTSE 202. For instance, the data store 228 includes a customer database 305 that is used to store information related to customers that use the OTSE 202 to book travel arrangements. FIG. 4 illustrates, in tabular format, one example of the type of information that may be stored within the customer database 305. Referring briefly to FIG. 4, a table 401 includes a record for each customer of the OTSE 202. Each record may include a customer identifier 403, authentication information 405 for the customer (such as a password), an email address 407 for the customer, and other information 409 associated with the particular customer.

The data store 228 also includes an airline database 307 that contains information about each airline in the airline network 204. In particular, the airline database 307 may identify each of the airlines in the airline network 204 and identify whether they are preferred airlines 207 or non-preferred airlines 209. Further, the airline database 307 may include the particular preferences associated with each of the preferred airlines 207.

The airline database 307 is used by the travel server 224 to identify the airlines from which to request a quote in response to an offer from the customer machine 201. FIG. 5 illustrates, in tabular format, one example of the information that may be stored within the airline database 307. Referring briefly to FIG. 5, a table 501 includes a record for each airline in the airline network 204. Each record includes an airline identifier (e.g., a carrier code) 503 that uniquely identifies each airline in the airline network 204. The record also identifies, in the preferred column 505, whether the corresponding airline is a member of the preferred airlines group 207 or the non-preferred airlines group 209. If the corresponding airline is a preferred airline, the record includes, in the preference column 507, the particular preference associated with the corresponding airline. For example, if there are five preferred airlines in the preferred airlines group 207, the preference column 507 may include a number from one to five, a letter from A to E, or any other indicator of the relative preferences of the preferred airlines 207. Moreover, for those airlines designated as preferred, the airline database 501 may include a preferred criteria column 508 that includes criteria for determining whether the preferred airline matches the offer. For example, if a particular criterion, such as an acceptable profit margin to the OTSE 202, had been negotiated by the most preferred airline, that criteria may be stored in the preferred criteria column 508 corresponding to the most preferred airline. In that way, the OTSE 202 may evaluate whether an offer provided by a preferred airline satisfies the criteria. Other information 513 associated with the corresponding airline may also be included in the other information column 509.

Returning to FIG. 3, the data store 228 also includes an offer history database 309, which contains the storage information related to offers provided to the OTSE 202 by various customers. As described in greater detail below, the offer history database 309 may be used by the travel server 224 to prevent customers from recursively submitting offers on the same travel services in an attempt to identify the lowest possible price point at which an offer may be matched. FIG. 6 illustrates, in tabular format, one example of the information that may be stored within the offer history database 309. Referring to FIG. 6, a table 601 includes a record for each offer provided to the OTSE 202. Each record includes an offer identifier 603 to uniquely identify the offer, and a customer identifier 605 of the customer that provided the offer. The customer identifier 605 may be the customer identifier 403 (FIG. 4) or some other mechanism to uniquely identify the customer, such as an e-mail address, IP address, or the like. The table 601 also includes a column of information used to purge stale records from the offer history database 309. In the described example, a record for an offer is purged from the offer history database 309 after a predetermined amount of time (e.g., 24 hours) has elapsed since the offer. Toward that end, a time column 607 may reflect the time when the corresponding offer was made. Other offer information 609 may also be included in the offer history database 309.

Returning once again to FIG. 3, other files 311 may also be contained within the data store 228. For instance, HTML and XML files served by the Web server 222 may be contained within the data store 228 for use in constructing user interface screens as will be described later. Other information may also be stored on the data store 228.

The Web server component 222 of the OTSE 202 controls the interface between the OTSE 202 and the customer machine 201. The Web server 222 includes a user interface component 303 configured a to assemble and serve Web pages over the Internet 206 to various computing devices, such as the customer machine 201. The user interface 303 may also receive information provided by interacting with those Web pages. Thus, the user interface 303 may make information received from the customer machine 201 available to the Web server 222, which may in turn make that information available to other components of the OTSE 202, such as the travel server 224.

The travel server 224 is configured to access the airline database 307 when an offer is provided to it by the Web server 222. Based on the parameters provided with the offer, the travel server 224 accesses the airline database 307 to identify potential airlines within the airline network 204 that may satisfy the offer. It should be noted that the travel server 224 need not contact the airlines directly or the GDS 203 to identify airlines that may potentially satisfy the offer. Rather, sufficient information about the participating airlines in the airline network 204 is stored locally within the airline database 307. The travel server 224 is also configured to interface with the GDS 203 to query for fares and availability provided by the airlines selected from the airline database 307. The travel server 224 may also be configured to make airline reservations with the GDS 203.

Illustrative User interface Screens

Figure 7:
Figure 9:
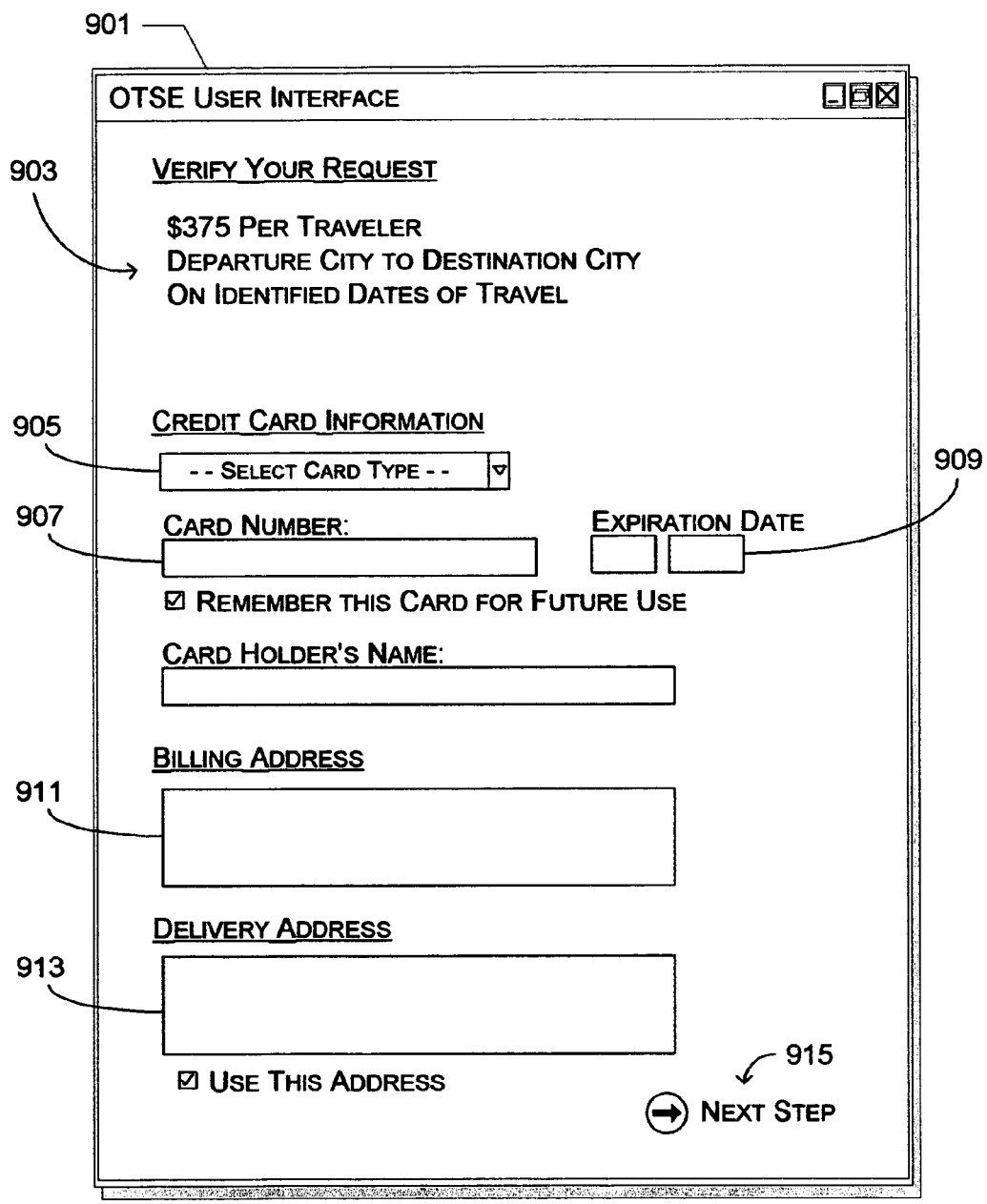

FIGS. 7-9 are sample screen displays that may be presented to a customer of the customer machine 201 when interfacing with the OTSE 202. Each of the sample screen displays represents one or more HTML or XML pages assembled and served by the user interface component 303 of the Web server 222, as interpreted and rendered by the Web browsing software 205 of the customer machine 201. The sample screen displays may be used by the system 200 to provide information to and receive information from the customer machine 201. The sample screen displays are provided as examples only, and the particular layout of the sample screen displays are not critical to a proper functioning of the invention.

FIG. 7 is a graphical representation of an initial screen display 701 presented to a customer to begin the offer process. In this screen display 701, the customer is prompted with a departure field 702 so that the customer may identify from what city or airport the customer wishes to begin the travel. The customer is also prompted with a destination field 703 so the customer can identify the destination of the travel, such as a particular city or airport. In this implementation, the departure field 702 and the destination field 703 are configured to receive alphanumeric indicators of either the names of the respective cities or airport codes that are commonly used to identify particular airports around the world.

The customer is also prompted with a departure field 705 and a returning field 707 which together allow the customer to define the desired travel dates. Additionally, the customer may be prompted with travelers fields 709 to identify the number of travelers that fall into certain age groups. The customer may be prompted with a connections field 711 to identify a maximum number of stops that the customer is willing to make while traveling. And finally, in this screen display 701, the customer is prompted for an offer value 713 that identifies the maximum amount that the customer is willing to pay (per traveler) for the airfare. It should be noted that the amount entered in the offer value field 713 will be the total amount charged to the customer upon a successful quote selection, as opposed to the prior practice of adding taxes and the like to the offer value before charging the customer. Optionally, the initial screen display 701 (or any other screen display) may provide the customer with an option of identifying particular airlines that the customer deems to be undesirable, and which should be avoided during the electronic exchange match selection. By activating the next button 715, the customer causes the information provided in the several fields on the initial screen display 701 to be posted to the Web server 222, where it is stored in the data store 228. Activating the next button 709 may also cause the user interface component 303 to transmit to the customer machine 201 a traveler identification screen display.

FIG. 8 is a graphical representation of a traveler identification screen display 801. In this embodiment, the traveler identification screen display 801 prompts the customer to provide personal information about the travelers identified in the previous screen. In particular, the customer may be prompted to provide a last name 803, a first name 805, and phone numbers 807 for each identified traveler. A special assistance field 809 may be provided to allow the customer to identify whether the traveler is in need of special assistance while traveling. In addition the customer may be prompted to provide contact information 811 in case of an emergency.

The OTSE 202 may require the customer to create an account prior to continuing with the offer matching process. For instance, the traveler identification screen display 801 may include fields, such as a member ID field 813 and a password field 815, that allow the customer to either create a new account or login to an existing account. A check box 817 may allow the customer to have the password 815 stored on the customer machine 201 to avoid having to retype the password later. Moreover, an e-mail field 819 may prompt the customer for an e-mail address associated with the account and to which confirmation may be transmitted. By activating the next button 821, the customer causes the information provided in the several fields on the traveler identification screen display 801 to be posted to the Web server 222, where the information is stored in appropriate locations, such as the customer database 305, or used to verify the customer's account. Activating the next button 821 may also cause the user interface component 303 to transmit to the customer machine 201 a verification screen display.

FIG. 9 is a graphical representation of a verification screen display 901. The verification screen display 901 may be generated by the user interface component 303 of the Web server 222 based on information provided through the other screen displays. For example, the Web server 222 (FIG. 3) may retrieve from the data store 228 the information provided on the initial screen display 701 and summarize that information in a summary field 903. The summary field 903 may provide the offer amount, the city pair, and the dates of travel for verification by the customer.

The verification screen display 901 may additionally prompt the customer for credit card information, such as a credit card type 905, credit card number 907, and expiration date 909. A check box field 911 may be provided to allow the customer to have the credit card information stored for future use, such as on the data store 228 or locally on the customer machine 201. A billing address field 911 may be used for credit card validation, and a delivery address field 913 may be used to identify where to deliver the tickets if purchased. Again, by activating the next button 915, the customer causes the information provided in the several fields on the verification screen display 901 to be posted to the Web server 222, where the information is stored and may possibly be verified. Activating the next button 999 may also cause the user interface component 303 to transfer control to the travel server 224 to proceed with the current offer transaction.

In summary, the preceding discussion has been directed to describing the configurations and functions of each of the several components, data structures, and subsystems of the online travel service exchanger system generally depicted in FIG. 2. The following discussion is presented as a detailed description of the interactions of the described components, data structures, and subsystems through processes performed in accordance with implementations of the invention.

Operation of an Exemplary Electronic Exchange Matching System

FIGS. 10-15 are logical flow diagrams that generally illustrate several processes performed by the illustrative online travel service exchanger system illustrated in FIGS. 2-9 and described above. The general and specific operation of the system 200 is illustrated through the several flow diagrams described below, with reference to the components of the system described above and illustrated in FIGS. 2-9. For ease of description, the flow diagrams disclose one embodiment of the operation of the present invention. However, it can be understood that different processes and/or different chronological orders may be implemented within the spirit of the present invention.

Figure 10:
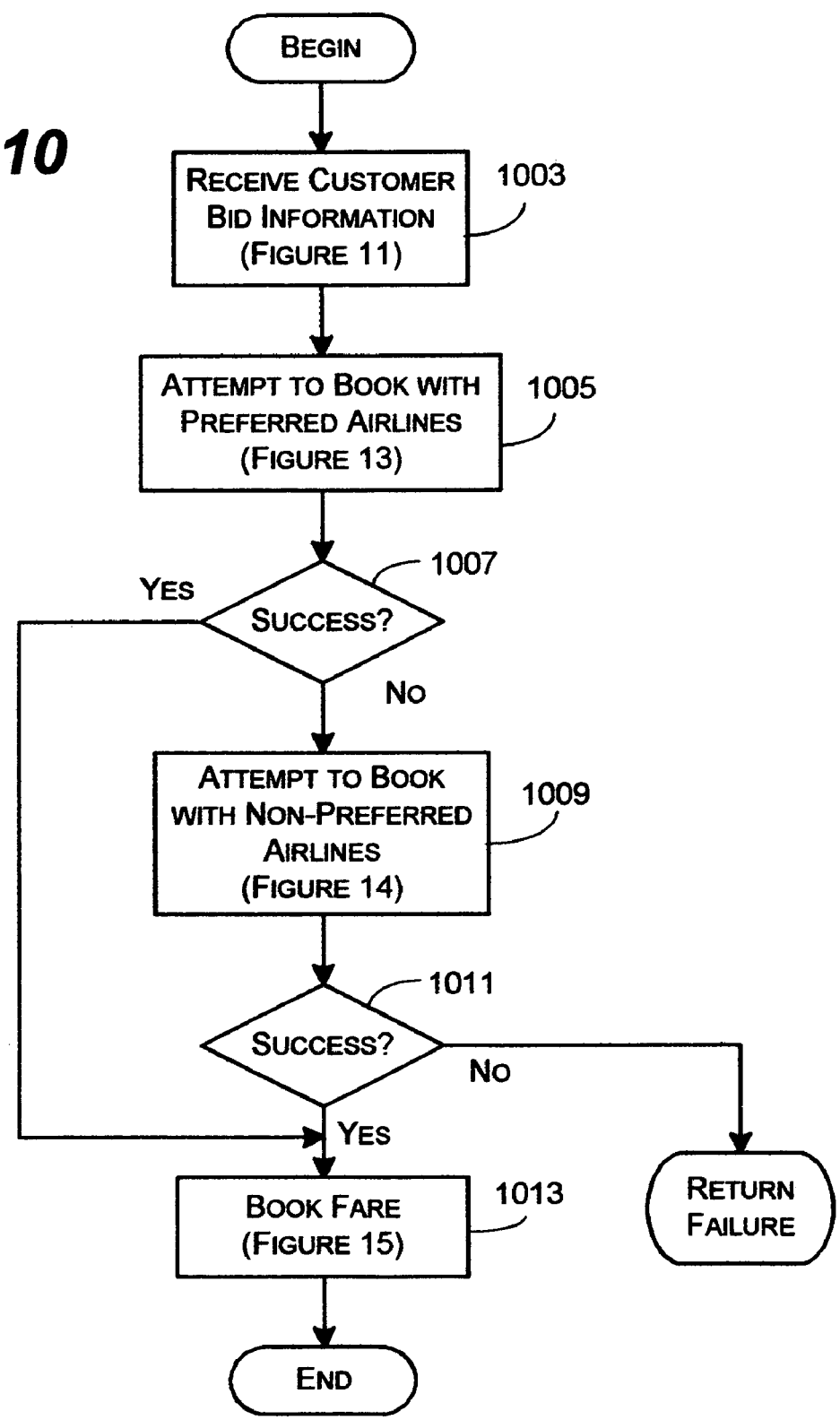
FIG. 10 is a logical flow diagram generally illustrating a process performed by one implementation of the present invention to match an offer from a customer with a quote from one or more providers.

FIG. 10 is a logical flow diagram generally illustrating a process performed by the system 200 to match an offer from a customer with a quote from one or more travel service providers. The process begins at step 1003, where the system 200 receives customer offer information. The operations performed at step 1003 are illustrated in detail in FIG. 11 and described below. Briefly described, the customer provides sufficient information for the system 200 to initiate the offer matching process. For example, in the described embodiment, the customer identifies at least an offer price and a description of the travel services, such as a travel city pair and dates of travel. In addition, the system 200 may request payment (e.g., credit card) information from the customer prior to proceeding with the offer process. Once the information is received, the process continues to step 1005.

At step 1005, the system 200 attempts to book the travel services with the preferred airlines. Briefly described, the system 200 attempts to book the requested travel services with each preferred airline, beginning with the most preferred, until either there are no more preferred airlines or until an acceptable fare is found. As can be understood, when the system 200 attempts to book the travel services, the quotes supplied by the providers are not shown to the user. The operations performed at step 1005 are illustrated in detail in FIG. 12 and described below. If none of the preferred airlines provide an adequate quote that satisfies the customer's offer, then, from decision step 1007 the process continues to step 1009.

At step 1009, the system 200 attempts to book the travel services with one of the non-preferred airlines. In an alternate embodiment, the system may also at this time try to book travel services with a preferred airline that does not meet the preferred criteria. That is, the fares from a preferred airline that were not acceptable for booking in step 1005 may be considered in step 1009 in the same consideration process given to the non-preferred airlines. In any event, the operations performed at step 1009 are illustrated in detail in FIG. 13 and described below. Briefly described, the system 200 issues requests to one or more of the non-preferred airlines (or preferred airlines fares that do not meet the preferred criteria as described above) for fares that correspond with the offer information (e.g., the travel city pair and travel dates). The system 200 then selects the lowest of the returned fares that satisfies the customer's offer. If none of fares satisfy the customer's offer, then, from decision step 1011 the process returns a failure indicating that the customer's offer was not accepted. If, however, an acceptable fare is returned, the system 200 selects that fare as the winning fare. If more than one acceptable fare is returned, the system 200 may select the lowest of the acceptable fares. At step 1013, the winning fare is booked with the corresponding airline. The operations performed at step 1013 to book the fare are illustrated in detail in FIG. 14 and described below.

It should be noted that, unlike previous systems where the customer may be charged taxes in addition to the offer amount, with the current system an estimate is made of any taxes that may be applicable to the particular travel services requested. The estimated taxes are then added to the evaluated fares to ensure that the amount charged to the customer's credit card does not exceed the offer amount. Once the customer has been charged, and appropriate notifications given, the process illustrated in FIG. 10 terminates.

Figure 11:
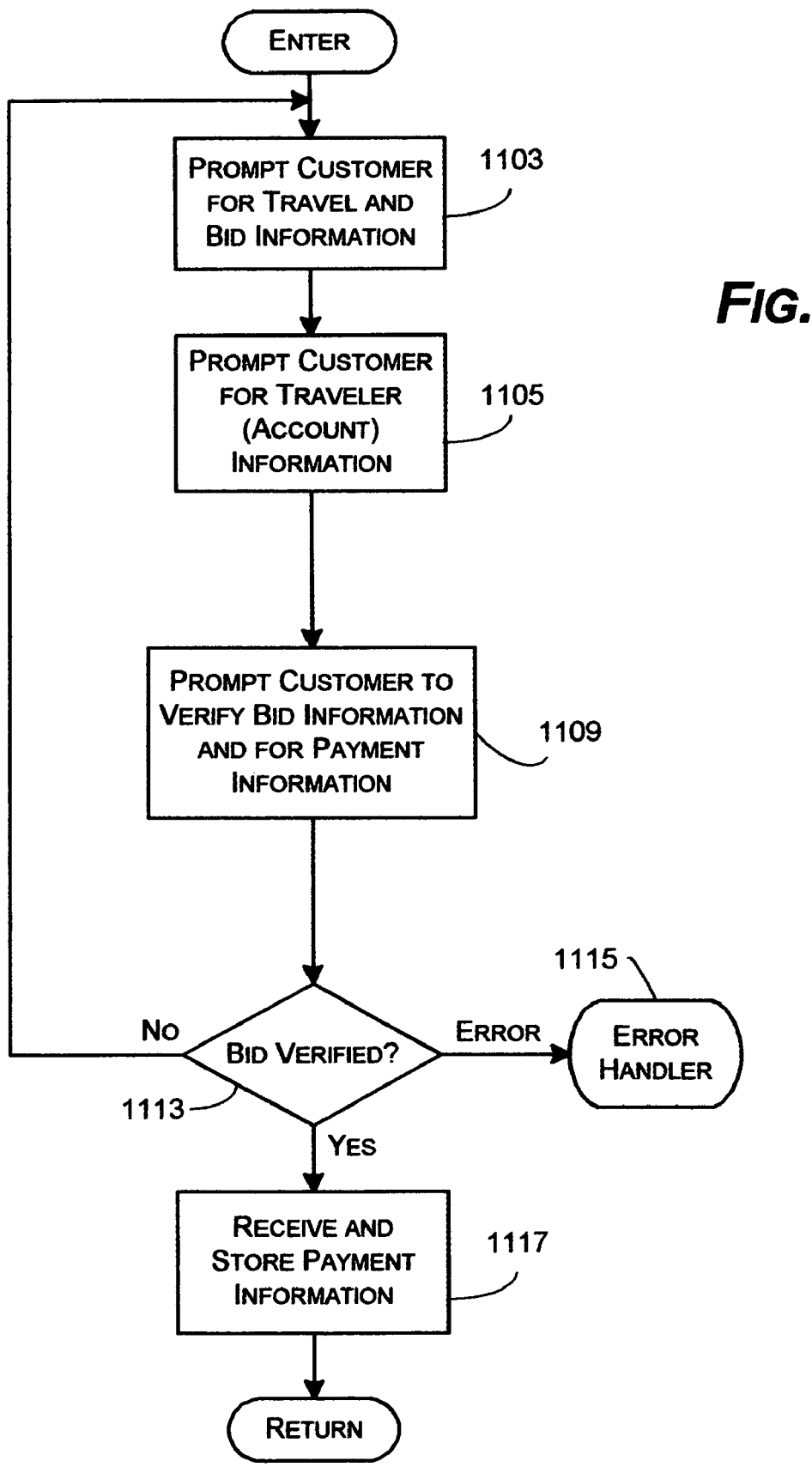
FIG. 11 is a logical flow diagram generally illustrating the functions performed by one implementation of the present invention to receive customer offer information.

FIG. 11 is a logical flow diagram generally illustrating the operations performed at step 1003 of the process illustrated in FIG. 10 to receive customer offer information. The process of FIG. 11 begins at step 1103, where the customer is prompted for information about the customer's travel plans, in particular the travel destination (e.g., a city) and the dates of travel. For example, the customer may be presented with the initial screen display 701 illustrated in FIG. 7 and described above.

At step 1105 the customer is prompted to identify the individuals for whom the travel services are being offer. Toward that end, the OTSE 202 may present to the customer the traveler identification screen display 801 illustrated in FIG. 8 and described above. The customer may be prompted to provide names and ages for each individual traveling. In addition, the customer may be required by the OTSE 202 to create or login to an account.

At step 1109, the customer is prompted to verify that the information thus far provided is accurate, and to confirm the offer transaction. For instance, the OTSE 202 may present the customer with the verification screen display illustrated in FIG. 9 and described above. As part of the verification, the customer may be prompted to provide payment information, such as a credit card number, prior to proceeding. If the customer indicates that the offer information is incorrect, then, from decision step 1113, the process returns to step 1103 where the customer is prompted to provide the offer information again. If the customer verifies the offer information, the process proceeds to step 1117 where the payment information is stored, and the process returns to FIG. 10. Alternatively, if an error occurs (e.g., failure of the credit card number) during the verification process, an error handling procedure may be implemented.

Figure 12:
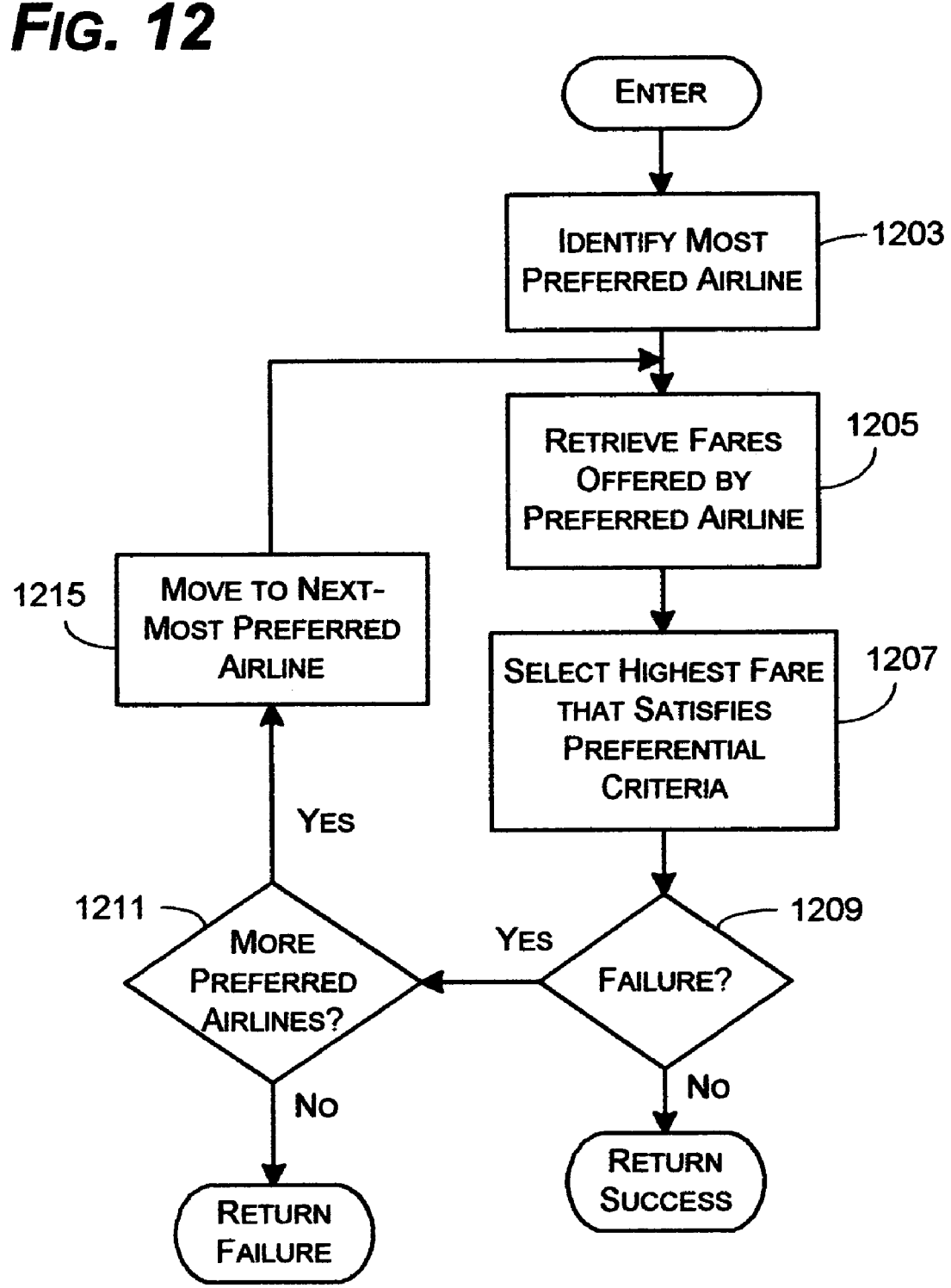
FIG. 12 is a logical flow diagram that generally illustrates a process performed by one implementation of the present invention to attempt to book airfare with one of a group of preferred airlines.

FIG. 12 is a logical flow diagram generally illustrating a process performed to attempt to match the customer's offer with one of the preferred airlines. The process begins at step 1203, where the OTSE 202 identifies the most preferred airline from the group of preferred airlines 207. To make that identification, the travel server 224 may query the records within the airline database 307. Once the most preferred airline is identified, the process proceeds to step 1205.

At step 1205, a request is sent to the GDS 203 for fares associated with the most preferred airline. The request includes the carrier code associate with the most preferred airline and the offer information, including the city pair and the travel dates. The request may additionally include a rate code that indicates that special pricing is being requested on behalf of the OTSE 202. When the GDS 203 returns the fares, the process continues at step 1207.

At step 1207, the OTSE 202 evaluates the fares returned to determine whether one or more of the fares satisfies the offer. It should be noted that the airline may return many, even dozens, of possible fares associated with the offer information. In that case, the system 200 selects the highest fare provided that still satisfies the preferred criteria 508 for the particular airline (stored in the airline database 307) and returns success to the process illustrated in FIG. 10 and described above. However, if none of the fares returned by the most preferred airline satisfies the preferred criteria 508, the process continues to decision step 1211.

As is described above, the preferred criteria is optional, and may only be needed in a situation in which the preferred airline has negotiated preferred status based upon an amount of the price that the airline is willing to forego in order to procure preferred status. If other methods are used to procure preferred status (e.g., market share or geographical preferences as described above), then an offer may be satisfied by comparing the price of the airfares provided by the preferred airline against the offer, with any adjustments needed for desired profit for the OTSE 202.

In any event, at decision step 1211, a determination is made whether there remain more preferred airlines that have not yet been requested to satisfy the customer's offer. If there are no more, then the process returns a failure to decision step 1007 of the flow diagram illustrated in FIG. 10. Otherwise, at step 1215, the travel server 224 takes the next-most preferred airline and returns to step 1205, where fares are requested from that airline. The process illustrated in FIG. 12 continues until either an acceptable fare is provided, or until the group of preferred airlines is exhausted.

Figure 13:
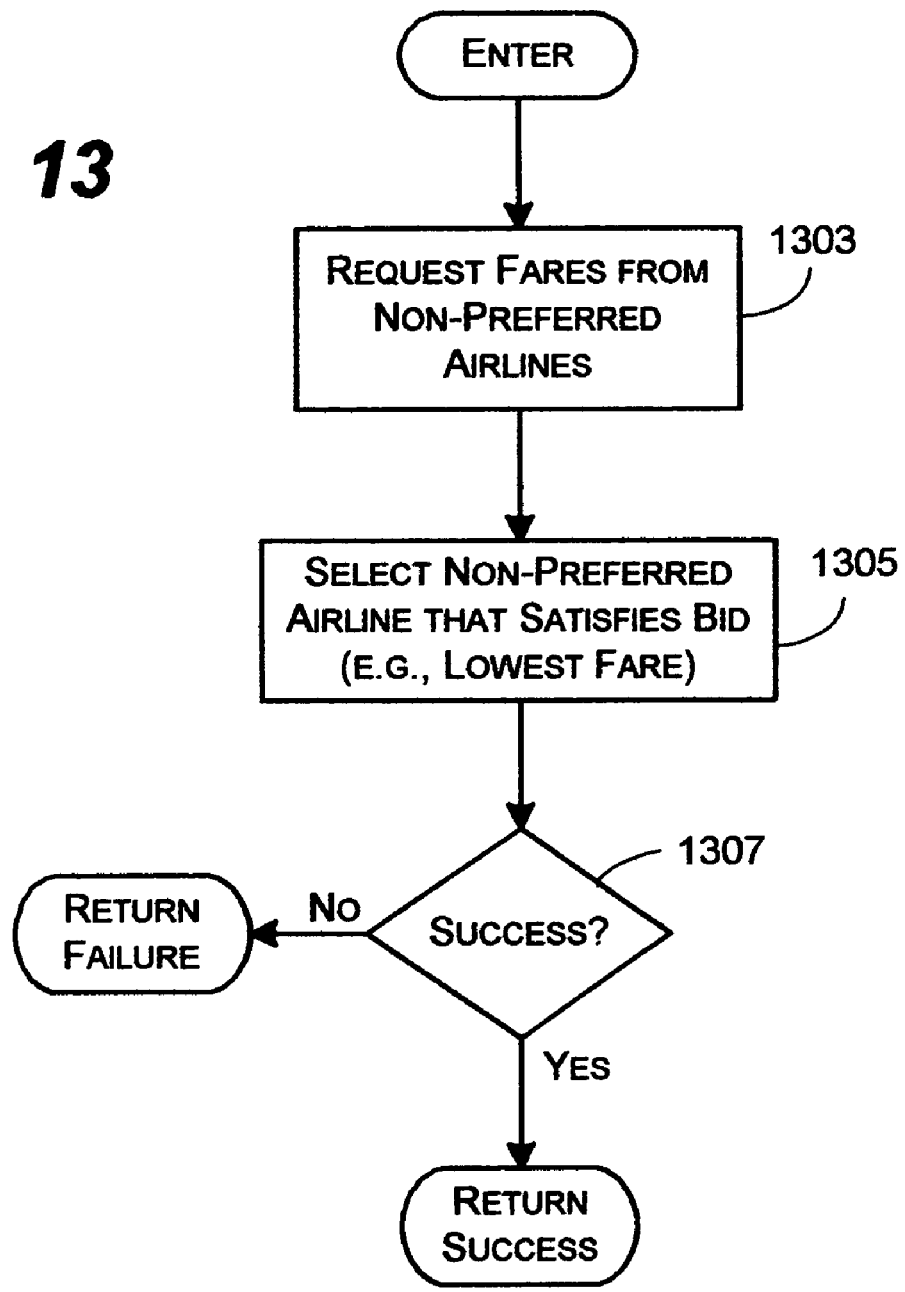
FIG. 13 is a logical flow diagram that generally illustrates a process performed by one implementation of the present invention to attempt to book airfare with one of a group of non-preferred airlines.

FIG. 13 is a logical flow diagram generally illustrating a process performed to attempt to book travel services that satisfy the customer's offer with a non-preferred airline. The process begins at step 1303, where a request for fares is issued to the GDS 203 for each non-preferred airline. Those skilled in the art will appreciate that each request may be issued by the travel server 224 to the GDS 203 in the form of a message including the airline identifier (carrier code) 503 and a rate plan code. The airline identifier 503 identifies the particular airline from which availability and fares are requested, while the rate plan code indicates to the GDS 203 that specially negotiated fares are being requested. The request additionally includes other offer information such as the dates of travel and city pair. A separate request may be issued for each non-preferred airline.

At step 1305, the travel server 224 may select from those fares returned by the several non-preferred airlines a lowest fare that satisfies the customer's offer. In other words, if the customer's offer could not be satisfied by the preferred airlines in accordance with the preferred criteria associated with the particular preferred airline, then the lowest returned fare may be selected from the non-preferred airlines. As noted above, fares supplied by the preferred providers, although not satisfying the constraints of the preferential treatment, may still be used in the non-preferred provider analysis. In that case, the fares provided by the preferred airlines are evaluated against the non-preferred airlines without regard to the preferred criteria. If an acceptable fare is identified, the process returns success to step 1009 of the flow diagram illustrated in FIG. 10. Otherwise, if an acceptable fare is not identified, the process returns failure to step 1009 of the flow diagram illustrated in FIG. 10.

Figure 14:
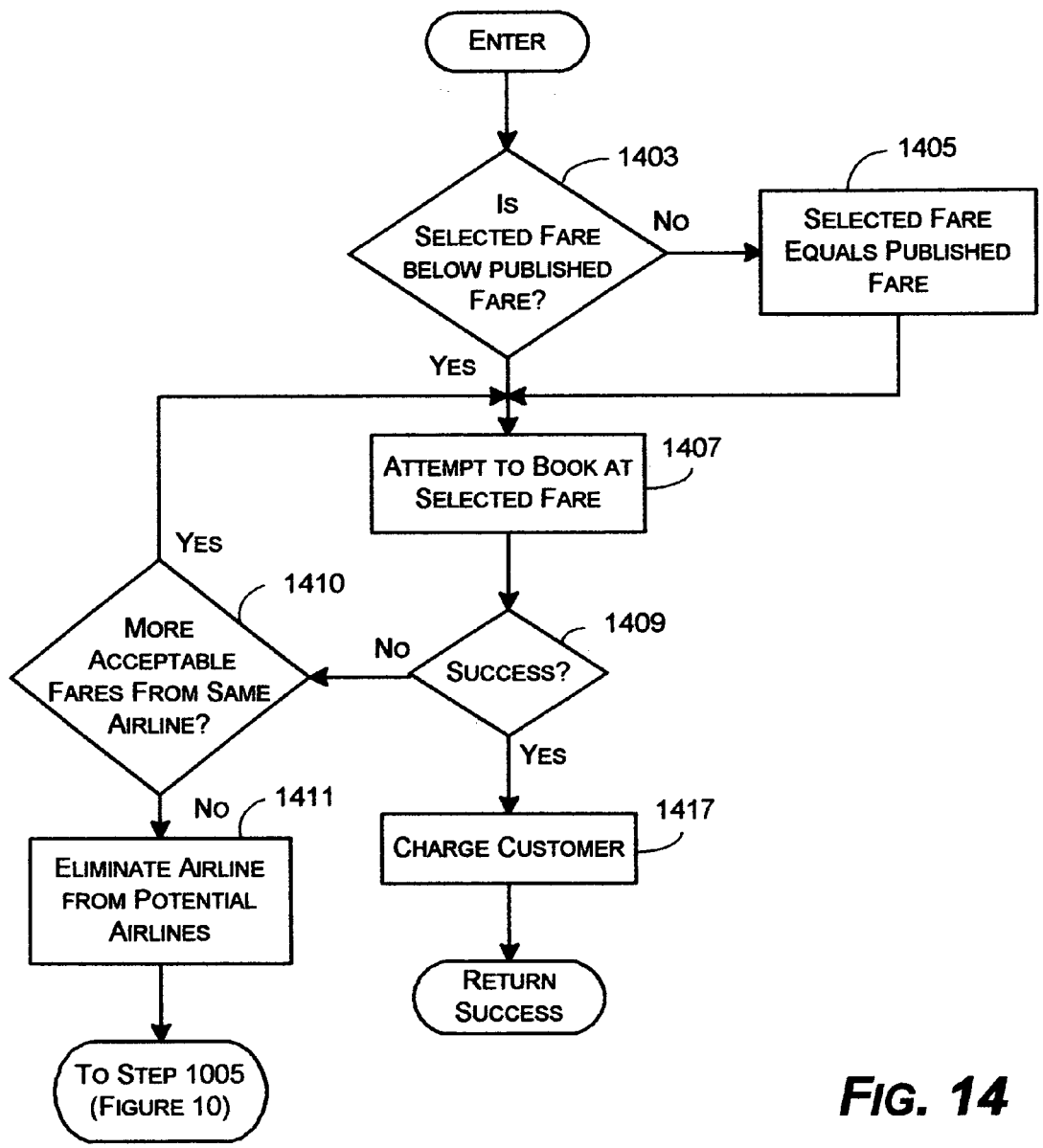
FIG. 14 is a logical flow diagram generally illustrating a process performed by one implementation of the present invention to book accommodations with a airline having been identified as a winner by one implementation of the present invention.

FIG. 14 is a logical flow diagram generally illustrating a process performed by the travel server 224 to book the selected fare. At decision step 1403, a determination is made whether the selected fare is higher than the winning airline's published fare for the travel services. Decision step 1403 is essentially a customer-protection reality check to ensure that customers are not charged for airfare through the system 200 in excess of what would be charged having gone through conventional travel arrangements. If the selected fare is above the published fare, then, at step 1405, the published fare is selected for booking and the process continues to step 1407. Otherwise, the currently selected fare remains the selected fare and the process continues to step 1407.

At step 1407, the travel server 224 attempts to book the airfare with the GDS 203 at the selected fare. If, at decision step 1409, the travel server 224 is successful at booking the accommodations at the selected fare, the process continues to step 1417, where the customer is charged for the airfare. It should be noted that the customer is either charged the offer value, or the published fare, depending on which is lower. The process then returns success to step 1013 illustrated in FIG. 10. However, if the travel server 224 fails to successfully book the accommodations (e.g., an airline providing a fare quote may respond that it no longer has availability at that fare), the process continues to step 1410.

At step 1410, the travel server checks to see if the preferred airline has other fares that are available. If so, then step 1410 loops back to step 1407, where the travel server attempts to book the other airfare. If there are not any other fares available from the preferred airline, then step 1410 branches to step 1411, where the winning airline is eliminated as a possible match for the offer. Then, at step 1413, the process returns to step 1005 of FIG. 10, where the process repeats to select another acceptable airline.

If desired, a time-out mechanism may be utilized to prevent a search for an individual from utilizing too many server resources. For example, the travel server may define a ten-minute limit for a search. The time-out may be treated as a failed search or may be handled in another manner as appropriate.

Although the system chosen to describe the present invention is an online travel service exchanger system, those skilled in the art will appreciate that many other types of electronic exchanges may benefit equally from the present invention. Moreover, the described implementations of the invention are susceptible to various modifications and alternative constructions. It should be understood, that there is no intention to limit the invention to the specific form or forms disclosed, but on the contrary, the intention is to cover all modifications, alternative constructions, and equivalents falling within the spirit and scope of the invention.

What is claimed is:

1. A computer-implemented method of matching an offer for a product with a quote, comprising:
   at a first computer:
      receiving the offer from a customer;
      selecting a preferred provider from a group of preferred providers;
      obtaining at least one quote for the product from the selected preferred provider;
      evaluating the at least one quote from the selected preferred provider to determine if the at least one quote satisfies the offer;
      if the at least one quote from the selected preferred provider does not satisfy the offer, repeatedly:
         selecting another preferred provider from the group of preferred providers;
         obtaining at least one quote for the product from the selected preferred provider; and
         evaluating the at least one quote from the selected preferred provider to determine if the at least one quote satisfies the offer;
         until the offer is satisfied or until the group of preferred providers is exhausted;
      if the group of preferred providers is exhausted without satisfying the offer, attempting to satisfy the offer from a group of non-preferred providers;
      if the offer is satisfied from either the group of preferred providers or the group of non-preferred providers, negotiating a purchase of the product from the provider associated with a satisfying quote; and
      if the offer is not satisfied from either the group of preferred providers or the group of non-preferred providers, returning an indication that the customer's offer was not accepted.

2. The computer-implemented method of claim 1, wherein attempting to satisfy the offer from the group of non-preferred providers comprises:
   obtaining at least one quote from one or more non-preferred providers in the group of non-preferred providers;
   evaluating the at least one quote obtained from each non-preferred provider to determine a most competitive non-preferred quote; and
   if the most competitive non-preferred quote can satisfy the offer, selecting the most competitive non-preferred quote as the satisfying quote.

3. The computer-implemented method of claim 2, wherein the most competitive non-preferred quote includes a lowest quote provided by a non-preferred provider.

4. The computer-implemented method of claim 1, wherein the product is a travel service.

5. The computer-implemented method of claim 4, wherein the travel service includes airfare.

6. The computer-implemented method of claim 1, wherein evaluating the at least one quote from the selected preferred provider comprises evaluating the quotes provided by the selected preferred provider in descending order of value, from a highest quote to the lowest quote, and selecting the highest quote that satisfies the offer.

7. The computer-implemented method of claim 1, wherein negotiating the purchase of the product from the provider associated with the satisfying quote includes making a reservation for a travel service provided by the provider at a value corresponding to the satisfying quote.

8. The computer-implemented method of claim 1, wherein each quote is obtained from each preferred provider and non-preferred provider indirectly through a global distribution system that stores fare information associated with each preferred provider and non-preferred provider.

9. The computer-implemented method of claim 1, wherein each preferred provider includes a respective associated preferred criteria, and wherein evaluating the at least one quote from the selected preferred provider to determine if the at least one quote that satisfies the offer comprises determining if the quote satisfies the preferred criteria associated with the selected preferred provider.

10. The computer-implemented method of claim 9, wherein attempting to satisfy the offer from the group of non-preferred providers comprises evaluating offers from the preferred providers that do not meet the preferred criteria.

11. A computer-readable medium having computer-executable instructions for performing the method recited in claim 1.

12. A computer-readable medium having computer-executable instructions which, when executed on a computer, comprise:
receiving from a customer machine an offer representing a value that a customer is willing to exchange for a product;
ranking each preferred provider in a plurality of preferred providers according to a preferred criteria;
selecting a highest ranked preferred provider from the plurality of preferred providers; and
attempting to match the offer from the customer with the highest ranked preferred provider by determining whether a quote obtained from the highest ranked preferred provider satisfies the preferred criteria associated with the highest ranked preferred provider.

13. The computer-readable medium of claim 12, further comprising:
if the attempt to match the offer with the highest ranked preferred provider is successful, negotiating a purchase of the product from the highest ranked preferred provider.

14. The computer-readable medium of claim 13, further comprising:
if the attempt to match the offer with the highest ranked preferred provider is unsuccessful, repeatedly attempting to match the offer with other preferred providers until either the offer is matched or until the plurality of preferred providers is exhausted.

15. The computer-readable medium of claim 14, wherein attempting to match the offer with other preferred providers is performed in descending order of the ranking associated with each preferred provider.

16. The computer-readable medium of claim 14, wherein if repeatedly attempting to match the offer with other preferred providers is unsuccessful, attempting to match the offer with one of a plurality of non-preferred providers, and, if successful, negotiating a purchase of the product from the matching non-preferred provider.

17. The computer-readable medium of claim 16, wherein attempting to match the offer with one of the plurality of non-preferred providers comprises obtaining from one or more non-preferred providers a quote to provide the product, and selecting a lowest quote from the quotes provided that satisfies the offer.

18. The computer-readable medium of claim 17 wherein each quote is obtained from each non-preferred provider indirectly through a global distribution system that stores fare information associated with each non-preferred provider.

19. The computer-readable medium of claim 12, wherein the product includes a travel service.

20. The computer-readable medium of claim 19, wherein the travel service comprises airfare.

21. The computer-readable medium of claim 14 wherein each quote is obtained from each preferred provider indirectly through a global distribution system that stores fare information associated with each preferred provider.

22. The computer-readable medium of claim 12 wherein the preferred criteria is negotiated with the preferred providers.

23. The computer-readable medium of claim 12 wherein the preferred criteria comprises a round robin decision process based upon industry market share of the preferred providers.

24. A computer system for matching offers with quotes, comprising:
an online travel service exchanger, including:
a web server component configured to interface with a customer machine over a network connection and receive from the customer machine an offer for a product, the offer identifying a cost for the product;
a travel server component configured to obtain at least one quote associated with each provider in a plurality of providers to provide the product at a cost, the plurality of providers comprising at least two groups: a preferred providers group and a non-preferred providers group, each preferred provider having a distinct preference ranking; and
the online travel service exchanger being further configured to attempt to match the offer with each preferred provider in the preferred providers group in descending order of preference.

25. The computer system of claim 24, wherein the online travel service exchanger is further configured to negotiate a purchase of the product from the provider selected as a match for the offer.

26. The computer system of claim 24, wherein the travel server component obtains the at least one quote associated with each preferred provider from a global distribution system configured to make available fare information associated with each preferred provider.

27. The computer system of claim 24, wherein the online travel service exchanger is further configured to evaluate quotes provided by each preferred provider in descending order of preference ranking by determining whether the quotes provided satisfy a preferred criteria associated with each preferred provider.

28. The computer system of claim 24 wherein the online travel service exchanger is further configured to attempt to match the offer with one of the non-preferred providers by evaluating quotes supplied by the non-preferred providers to identify a lowest quote and selecting the lowest quote as the matching quote.

29. The computer system of claim 28, wherein the travel server component obtains the at least one quote associated with each non-preferred provider from a global distribution system configured to make available fare information associated with each non-preferred provider.

* * * * *